Feb. 15, 1955     J. D. LAVIN     2,702,185
CARBURETOR

Filed July 3, 1951     3 Sheets-Sheet 1

INVENTOR.
JOSE DOMINGO LAVIN.

ATTORNEY.

Feb. 15, 1955 J. D. LAVIN 2,702,185
CARBURETOR

Filed July 3, 1951 3 Sheets-Sheet 2

INVENTOR.
JOSE DOMINGO LAVIN.
BY
ATTORNEY

Feb. 15, 1955    J. D. LAVIN    2,702,185
CARBURETOR
Filed July 3, 1951    3 Sheets-Sheet 3
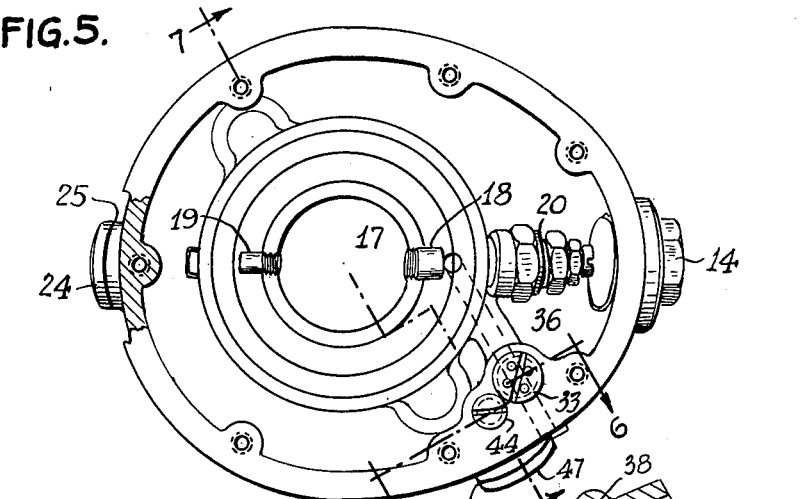
FIG. 5.
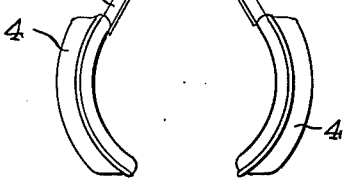
FIG. 8.
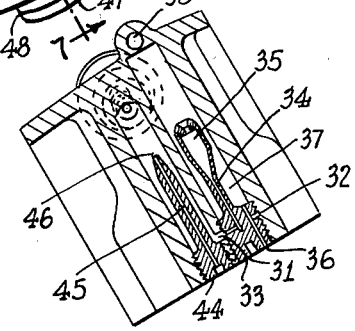
FIG. 6.
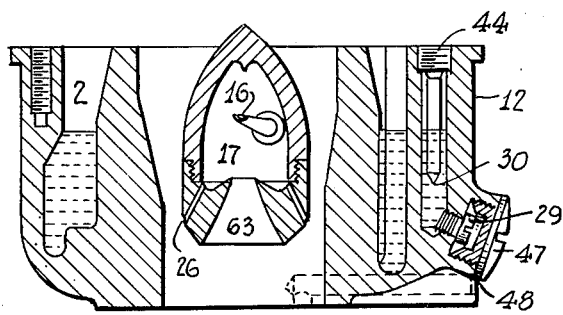
FIG. 7.
INVENTOR.
JOSE DOMINGO LAVIN.
BY 
ATTORNEY.

United States Patent Office 2,702,185
Patented Feb. 15, 1955

2,702,185

CARBURETOR

Jose Domingo Lavin, Mexico City, Mexico

Application July 3, 1951, Serial No. 235,014

Claims priority, application Mexico October 23, 1950

1 Claim. (Cl. 261—78)

This invention relates to an apparatus that carburets mixtures of fuel and air, known as a carburetor.

It is an object of this invention to provide a carburetor for internal combustion engines, for use with, for example, land motors, stationary or transport motors, marine and aerial motors, etc.

The carburetor is provided with a system of butterfly-valves to control the mixture volume, and also to control the enrichment of the said mixture, when necessary. These two systems are linked one to each other and also are linked to the throttle and choke of the motor by a system of levers, a system of storage of fuel at constant level; a system to provide proper measuring of the air and the fuel at high speeds of the motor, and a system to properly measure the air and fuel at low and idle speeds of the motor.

It is a further object of the present invention to provide in a carburetor having a fuel storage tank, air-passage means and a fuel admission needle-valve for controlling the feeding of the fuel to the tank, wherein the tank is disposed around the air-passage means and novel provision is made for controlling the fuel at constant level and for equalizing the pressure within the tank with the atmospheric pressure, and to control the volume of the fuel-air mixture entering the engine to which the carburetor is fixed, and a still further object being to provide means for measuring the fuel.

Referring to the drawings:

Fig. 5 is a partly sectional and partly perspective view of a portion of Fig. 1;

Fig. 6 is a sectional view taken on line 6—6 of Fig. 5;

Fig. 7 is a sectional view taken on line 7—7 of Fig. 5; and

Fig. 8 is a top plan view showing a detail of the double float.

Before explaining in detail the form of operation of the carburetor, I desire to have it understood that the invention is not limited to the details of construction and arrangement of parts, which are illustrated in the accompanying drawings, since this invention is capable of other embodiments, and that the phraseology which is employed is for descriptive purposes. Reference is made to a single throat carburetor, with a single principal air passage, but this single carburetor may have two or more throats, or principal air passages, according to the use for which the carburetor was designed.

*The system of storage of fuel at constant level*

Figure 4:
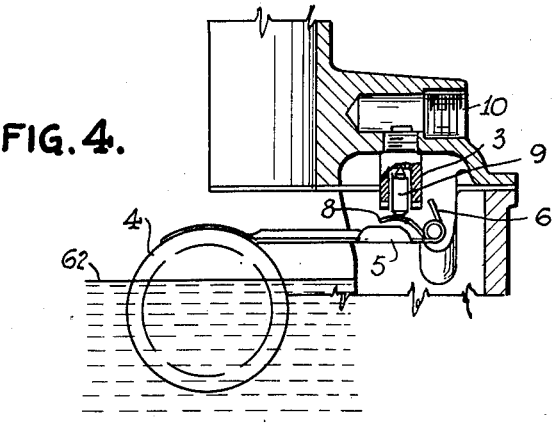
Fig. 4 is a detail sectional view of the right hand upper part of Fig. 1 taken on line 4—4 of Fig. 2.

Around the principal or main air passage 1, is built a storage tank 2, for the fuel. This tank is bolted to a cap 7 by means of the bolts 64 and is fed by a needle-valve 3, operated by a double-float 4 (Fig. 4).

The flotation centers of the floats are located on the same vertical plane that passes on the vertical axis of the main air passage 1, thus, the level of the fuel remains constant, whichsoever be the inclination of the carburetor.

The pair of floats are linked together by a fork 5, which is hinged to a fixed support 6 in the cap 7. This fork has a tongue 8 that operates on the base of the needle 9 of the fuel admission needle-valve 3.

The needle-valve 3 is fixed in the cap 7 and receives the fuel that arrives through the pipe 10.

This system allows for the regulation of the relative position of the needle with the floats, by moving upward or downward the tongue 8, regulating in this way the pressure on the needle 9 of the needle-valve 3, compensating in this way the different pressures in the fuel-line.

The fuel storage tank 2 is connected by the tube 11 to the upper part of the carburetor, in order to equalize the air pressure in the fuel storage tank 2, with the outside air pressure.

*The system to provide proper and metered mixtures of fuel and air at high speeds of the motor*

Figure 1:
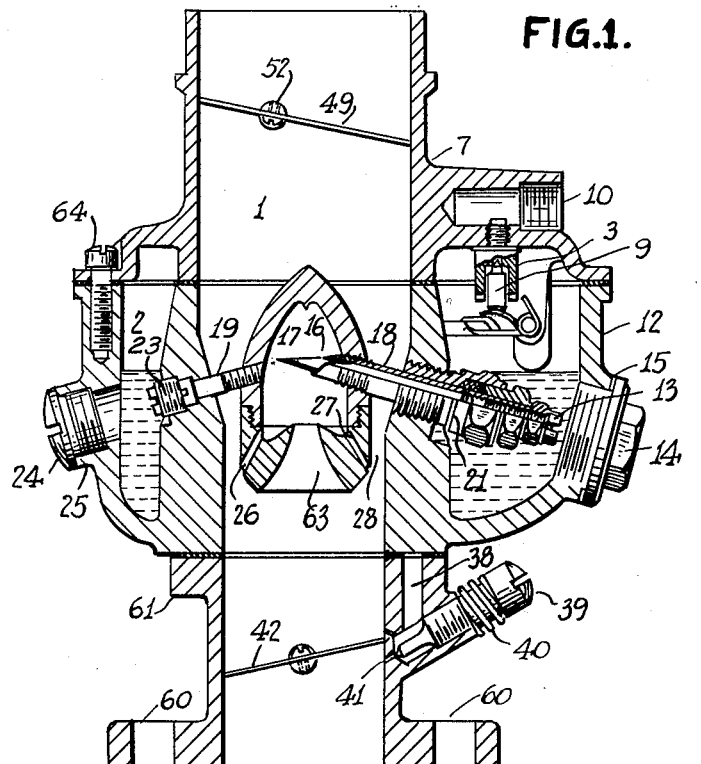
Fig. 1 is a sectional view of a carburetor made in accordance with the invention taken on line 1—1 of Fig. 2.
Figure 2:
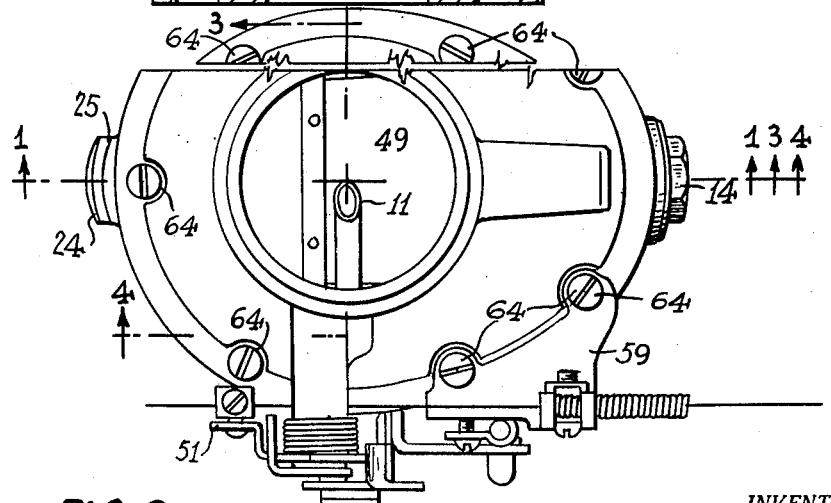
Fig. 2 is a top plan view thereof (partly broken away)
Figure 3:
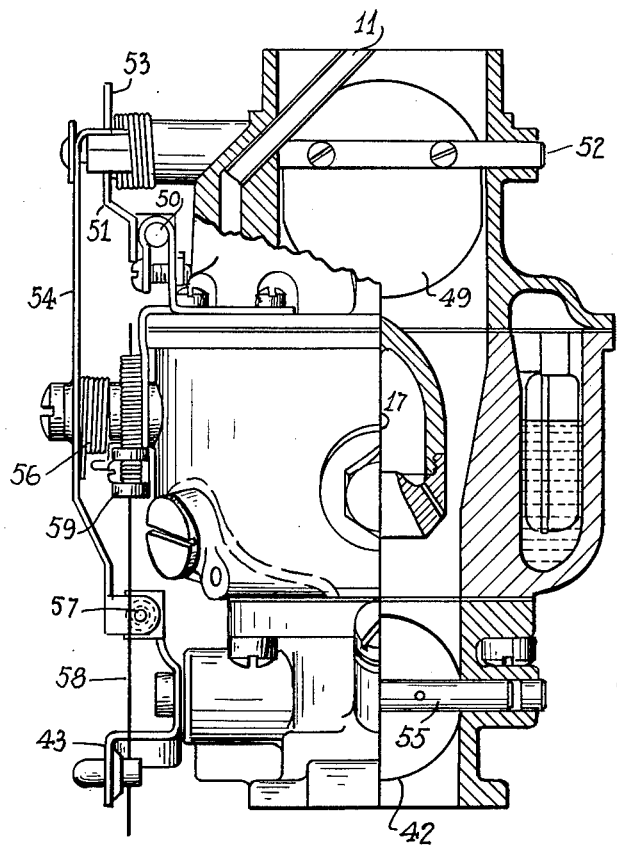
Fig. 3 is a partly perspective and partly sectional view of the carburetor shown on Fig. 1 taken on line 3—3 of Fig. 2.

In the bowl 12 (Fig. 1) of the carburetor and below the fuel level, there is a metering device 13 (Fig. 1) which can be easily removed by the plug 14, said plug 14 having a gasket 15. Said metering device meters the amount of fuel.

The fuel after being metered by the metering device 13 flows in the tube 16, where it takes its proper level.

The end of the tube 16 is in the vertical axis of the vaporizing chamber 17. This vaporizing chamber 17 is placed co-axially with the vertical axis of the carburetor, and it is supported in place by the two supports 18 and 19. Support 18 is hollow and through it passes the tube 16 that connects with the metering device 13; this hollow support 18 is fixed to the carburetor by a system of nuts of proper design 20 and has a special gasket 21 of a suitable material that is not affected by the fuel. Ready access may be gained from the exterior of the carburetor by inscrewing the plug 14.

The second support 19 is solid and is screwed to the carburetor body, having also a gasket 22 of proper material unaffected by the fuel. This support 19 is fixed by a screw 23.

This second support 19 is readily accessible by unscrewing the plug 24 which has a gasket 25 of suitable material.

The vaporizing chamber 17 of a special design, such as indicated in the accompanying drawings, is a complete revolution, made by the section seen in Fig. 7, rotating on its vertical axis. The upper exterior part is of conical form, the middle part is cylindrical and the lower exterior part is an inverted cone. The lower part of this conical surface forms an orifice that runs upward in a funnel shape to the lower inside part of the vaporizing chamber 17.

The lower part of the interior of said vaporizing chamber 17 is connected with the circular edge 26 made by the intersection of the cylindrical surface in the exterior of the chamber 17, with the inversed conical surface, by means of a plurality of tubes 27, providing a system of radial tubes that connect the inside of the vaporizing chamber 17 with the annular space 28, said annular space being limited by the interior of the tube 1, and the outside part of the vaporizing chamber 17.

*The system to provide proper measuring of the air and the fuel at low and idle speeds of the motor*

In the lower part of and within the bowl 12 (Fig. 7) is a metering device 29 that measures the flow of the fuel that goes to a vertical tube 30. This vertical tube 30 connects by means of an orifice 31 with an annular space 32 in the piece 33. From said annular space 32 the fuel flows to a vertical tube 34 that leads to a vaporizing chamber 35. The air is taken from the upper part of the chamber 2 and passes through the device 36 to the interior of the tube 37 that connects with a passage 38, said passage 38 having a screw valve 39 with a spring 40. This screw valve controls the amount of mixture that flows by the orifice 41 in the tube 1 and below the butterfly-valve 42, controlled by the lever 43 connected with the throttle.

Within orifice 30 there is a tube 44 that takes air from the upper part of the chamber 2 and conducts the air through a passage 45 to its end 46. This has the object of making a primary mixture of air in the fuel and also, when the system stops working, to break the siphon, that could be made between the tube 37 and the tube 30.

In order to have access to the metering device 29, that measures the flow of the fuel in the low and idle position, it is only necessary to unscrew the plug 47 which is provided with a gasket of suitable material.

Due to the design of this carburetor, it is possible with facility to gain access to the metering jets (which measure the flow of the fuel) from the exterior of the carburetor, and without it being necessary to take it apart. This access facilitates cleaning and changing the metering jets, when this is necessary.

The carburetor has in its upper part a butterfly-valve 49 that throttles the flow of the air in the inside tube 1 of the carburetor. Butterfly-valve 49 operates by means of a choke-wire that connects the lever 51 to the axis 52 of the butterfly-valve 49. Also, a lever 53 operates the lever 54 which moves the lever 43, fixed to the axis 55 of the butterfly-valve 42 of the throttle, in such a way that, when the butterfly-valve 49 of the choke is closed, the butterfly-valve of the throttle opens a little.

The lever 54 has a spring 56 that holds it back to initial position, when the choke-wire cable 50 is inactive.

The lever 43 which operates on the axis of the butterfly-valve of the throttle has a screw 57 that permits control of the minimum opening of the throttle butterfly-valve. This lever 43 has a control member 59 operable by means of a wire 58, member 59 being screwed to the exterior of the carburetor.

Operation

The carburetor is bolted to the manifold of the motor, the bolts passing through holes 60 of the double flange 61 in the carburetor base. The fuel line of the motor is connected in the threaded hole 10, so that the needle-valve may receive fuel. When the carburetor is in operation, the needle-valve lets the fuel in until the level of the fuel reaches the proper setting 62. Level 62 is below the upper part of the feeding tube 16 in the vertical center of the vaporizing chamber 17. The difference in distance between the level 62 and the upper part of the tube 16 is indicated by calibrations and is controlled by moving up or down the tongue 8.

When the motor starts, the butterfly-valve 49 of the choke is closed and the butterfly-valve 42 of the throttle is slightly open. This operation creates an excessive vacuum in the interior of the carburetor 28, which vacuum is transmitted to the interior of the vacuum chamber 17 by its central orifice 63. The vacuum vaporizes the fuel in the interior of the chamber 17. This vaporized fuel is mixed with the air within the vaporizing chamber 17. This considerably rich mixture of air-fuel goes out through the radial orifices 27.

The process of the air going into the vaporizing chamber 17 by the central orifice 63 and leaving the chamber by the radial orifices 27, is due to the fact that in the lower end of the radial orifices 26 the vacuum is higher than in the central orifice 63.

If the engine continues to run, the choke butterfly-valve 49 opens and lets the air pass freely. In the interior of the vaporizing chamber 17 the air enters at a pressure lower than atmospheric and this air is being fed with the fuel (already measured by the metering device 13) making a first mixture which is very rich and that is expelled through the radial passages 26. In these radial passages, and due to the velocity of the mixture, the mixture becomes perfectly homogenized, which forms the second step in the formation of the mixture. When the homogenized mixture flows by the end of the radial passages 27, it is mixed again with the air that is passing around the vaporizing chamber 17, which forms the third step in the process of making the mixture.

The amount of air is measured by the area between the vaporizing chamber 17 and the interior throat 1 of the carburetor. The volume of the mixture is controlled by the butterfly-valve 42 of the throttle.

When the butterfly-valve 42 of the throttle is in an almost closed position, but with the choke valve 49 either fully open or nearly fully open, the vacuum in below valve 42 becomes higher, causing suction through the orifice 41 of the low and idle system.

When the tube 37 is in partly vacuum, it sucks air through orifices 36 and this air when passing around the little vaporizing chamber 35 produces a vacuum in the latter by which the fuel is measured. The low speed metering jet 29 flows from the tube 30 through the orifice 31 to the interior of the vaporizing chamber 35. The little vaporizing chamber 35 works on the same principle as that of the vaporizing chamber 17.

This system produces in the tube 37 an air-fuel mixture which flows into the carburetor below the throttle butterfly-valve 42 and can be measured by means of the screw 39. As the throttle butterfly-valve 42 progressively opens, the vacuum in the space therebelow decreases, the principal vaporizing chamber 17 commences to function and the low speed system ceases functioning (see Figs. 5, 6 and 7).

To avoid siphoning of the fuel from the tube 30 to the vaporizing chamber 34, when the system ceases to work, there has been provided a tube 44 which takes air from the upper part of the bowl and this air breaks the siphon action.

Tube 44 has a device calibrated in such a way that the air that passes through it, breaks the siphon action when the vacuum in the tube 37 is low.

I have found in numerous test runs which were carried out that an increase in the values of the torque as indicated in the torque-curve results in an increase in horse power, and also in a big economy in the cost of operation.

These results are due:

(1) A smaller friction of the air when passing through the carburetor, and (2) That in order to bring about a determined air-fuel mixture, it required less fuel than in other types of carburetors, because less fuel is wasted when the mixture is provided in three steps, namely, (1) in the vaporizing chamber 17; (2) when the first mixture passes at high speed through the radial orifices 27, where due to the high speed, it is partially compressed and the mixture of fuel and air is homogenized; and (3) when the mixture already homogenized is mixed again with the passing air around the vaporizing chamber.

As a result of the foregoing, when the motor is stopped, there cannot exist any flooding condition because the fuel level in the storage tank is lower than that in the upper part of the discharge pipe 16 in the center of the vaporizing, diffusing and distributing chamber 17.

When the motor is stopped, the radial orifices 27 are filled with the fuel which in film form has been deposited in the interior part of the vaporizing chamber 17, and this fuel does not come down in drops because the diameter of the orifices is such that the surface tension of the fuel holds it in the orifices. When the motor starts running and when the carburetor begins to have a vacuum, this amount of fuel stored in the radial orifices is sucked down and serves as priming to the motor in order to cause the latter to start immediately.

Although I have described my improvements with considerable detail and with respect to a certain particular form of my invention, I do not desire to be limited to such details since many changes and modifications in the form, arrangements, proportions and sizes thereof may well be made without departing from the spirit and scope of my invention in its broadest aspect.

Having thus described my invention, what I claim as new and desire to secure by Letters Patent, is:

A carburetor comprising a casing defining a vertically disposed main air passage for movement of air downwardly therethrough to an associated engine, a vaporizing, mixing and distributing member disposed coaxially within said main air passage and spaced therefrom to provide an annular space between the outer surface of said member and the inner wall surface of said casing, said member having an upwardly tapering, streamlined upper outer surface portion, a cylindrical intermediate outer surface portion and a lower outer surface portion having the configuration of a frustum of an inverted cone, said member being hollow to define a chamber in the interior thereof and having a central opening at the bottom thereof of relatively large cross-section to communicate said chamber with said air passage at the bottom of said lower outer surface portion, said member further having radial, substantially oblique bores of relatively small cross-section extending from said chamber to the outer surface of the member at the intersection of said intermediate and lower outer surface portions, so that an air flow will be produced upwardly through said central opening into said chamber and thence radially outward through said bores, a conduit extending at one end into said chamber and opening upwardly adjacent to the upper portion of said chamber for supplying fuel to said chamber so that the fuel is preliminarily mixed with the air in said chamber to provide a rich mixture, the rich mixture being homogenized during its relatively high speed travel through said radial bores and the homogenized mixture being finally mixed with additional air at the exit ends of said radial bores, and means for maintaining fuel in said conduit at a level below the open end of the conduit so that the fuel flow into said chamber is halted when the air flow through the chamber ceases.

References Cited in the file of this patent

UNITED STATES PATENTS

| Number | Name | Date |
|---|---|---|
| 1,283,784 | James | Nov. 5, 1918 |
| 1,781,066 | Meunier | Nov. 11, 1930 |
| 1,872,291 | Hobbs | Aug. 16, 1932 |
| 1,895,471 | Mathieu | Jan. 31, 1933 |
| 2,201,603 | Wirth | May 21, 1940 |
| 2,212,926 | Wirth | Aug. 27, 1940 |
| 2,297,109 | Moseley | Sept. 29, 1942 |
| 2,541,316 | Winkler | Feb. 13, 1951 |

FOREIGN PATENTS

| Number | Country | Date |
|---|---|---|
| 524,435 | France | May 12, 1921 |